United States Patent
Phillips, Jr. et al.

[11] Patent Number: 5,951,035
[45] Date of Patent: Sep. 14, 1999

[54] TRAILER HITCH ALIGNMENT SYSTEM

[76] Inventors: Robert E. Phillips, Jr., 518 Shoreview Dr., Rockwall, Tex. 75087; David E. Veracka, 1515 Endicott, Arlington, Tex. 76018

[21] Appl. No.: 08/816,060

[22] Filed: Mar. 11, 1997

[51] Int. Cl.$^6$ ............................................. B60D 1/36
[52] U.S. Cl. ................................ 280/477; 340/431
[58] Field of Search ........................ 280/504, 511, 280/477; 340/431, 438

[56] References Cited

U.S. PATENT DOCUMENTS

| | | | |
|---|---|---|---|
| 3,710,370 | 1/1973 | Quilici et al. | 340/431 |
| 4,560,183 | 12/1985 | Cook | 280/477 |
| 4,627,633 | 12/1986 | Gehman et al. | 340/431 |
| 4,852,901 | 8/1989 | Beasley et al. | 280/477 |
| 5,159,312 | 10/1992 | Engle | 340/431 |
| 5,161,815 | 11/1992 | Penor, Jr. | 280/477 |
| 5,191,328 | 3/1993 | Nelson | 280/477 |
| 5,434,552 | 7/1995 | Ems | 340/431 |
| 5,558,352 | 9/1996 | Mills | 280/477 |
| 5,729,194 | 3/1998 | Spears et al. | 340/431 |

*Primary Examiner*—Kevin Hurley
*Attorney, Agent, or Firm*—Smith & Danamraj, P.C.

[57] ABSTRACT

The trailer hitch alignment system of the present invention includes an alerting device and a tow bar assembly for attachment to a towing vehicle. The tow bar assembly includes a photoelectric sensor for detecting the vertical alignment of a trailer tongue. The tow bar assembly has a hitch ball with a spherical top and a cylindrical body for coupling with a trailer tongue having a semi-spherical socket. In one embodiment, the photoelectric sensor is mounted on the tow bar of the tow bar assembly, adjacent to the hitch ball. In another embodiment, the hitch ball houses the photoelectric sensor within its interior. During operation, the driver of the towing vehicle typically maneuvers the vehicle toward the trailer in a rearward direction. Once the photoelectric sensor detects the vertical alignment of the socket with the ball, the alerting device is activated informing the driver of the alignment.

10 Claims, 3 Drawing Sheets

TRAILER HITCH ALIGNMENT SYSTEM

BACKGROUND OF THE INVENTION

1. Technical Field of the Invention

This invention relates to trailer hitches, and more particularly, to a system for alignment of a trailer hitch which allows a vehicle driver to easily align the vehicle hitch to a trailer tongue without assistance.

2. Description of Related Art

Trailer hitches for coupling a towing motor vehicle to a trailer are well known. Standard trailer hitches commonly include a socket on the tongue of a trailer for connection with a ball mounted on the towing bar of the towing vehicle. Coupling of the ball and socket requires the driver of the motor vehicle to rearwardly maneuver the vehicle until the ball of the hitch is vertically aligned with the socket of the trailer. Without assistance, the driver typically has difficulty maneuvering the ball into position for engagement with the socket since the ball and socket are outside the driver's field of vision. Even with assistance, vertical alignment of the trailer hitch components may be a frustrating and time consuming task.

A number of prior art references exist which attempt to assist the vehicle driver with the alignment and coupling of the trailer hitch. Such references include U.S. Pat. No. 4,560,183 issued to Cook, U.S. Pat. No. 5,161,815 to Penor, and U.S. Pat. No. 5,558,352 to Mills. These references are discussed briefly below.

In Cook '183, a hitch guide having a base is mounted upon the towing vehicle hitch and includes a pair of rearwardly projecting lateral guides forming a first cam surface. A second cam surface is connected to the trailer tongue. The cam surfaces cooperate to cause relative vertical displacement between the vehicle hitch and the trailer tongue as the vehicle nears the trailer, thereby aligning the trailer tongue during the rearward approach of the hitch until the ball and socket are in position for coupling.

The self aligning trailer hitch disclosed in Penor '815 includes a trailer tongue having a dual ball system, and a vehicle hitch having a multiple piece socket assembly including a rotatable receiving claw. During the alignment and coupling operation, the lower ball bears against the receiving claw causing the upward rotation of the receiving claw into a socket creating position, and the upward installation of a locking abutment to hold the ball in place and secure the rotating claw.

In Mills '352, the disclosed trailer hitch alignment device utilizes two masts with flags mounted upon the respective hitch components of the towing vehicle and the trailer. These masts, mounted on magnetic domes, serve as improved visual reference points for the driver.

Although each reference provides some assistance to a driver attempting to align and couple a trailer hitch, each device requires either an attachment to, or a modification of the standard trailer tongue. Therefore, there remains a need in the art for an alignment system that is simple in design and easy to use which does not require adaptation of every trailer tongue used with the system. The present invention provides such a system.

SUMMARY OF THE INVENTION

The present invention provides a trailer hitch alignment system for use in engaging a towing vehicle with a trailer. The alignment system includes an alerting device and a tow bar assembly having a sensor mechanism for detecting the vertical alignment of a trailer tongue. During operation, the alerting device is activated in response to the sensor mechanism's detection of a trailer tongue in vertical alignment with the tow bar assembly.

In one embodiment, the tow bar assembly includes a ball, having a spherical top and a cylindrical body, for coupling with a trailer tongue, having a semi-spherical socket with a concave surface. When the sensor mechanism of the invention detects the vertical alignment of the spherical top of the ball with the concave surface of the socket, the alerting device is activated.

In one embodiment of the present invention, the sensor mechanism is mounted on the tow bar, proximal to the ball of the hitch. In another embodiment, the sensor mechanism is adjacent to said ball. In still another embodiment, the spherical top and cylindrical body of the ball have an aperture extending therethrough along a central vertical axis, the ball forming an annular casing adapted for receiving the sensor mechanism.

In another embodiment of the present invention, the sensor mechanism includes a photoelectric infrared sensor having an approximate sensing range of sixteen inches. In still another embodiment, the sensor mechanism includes a diffuse reflective unit having a transmitter and a receiver, wherein said unit transmits a focused beam adapted for reflection off the concave surface of the socket of the trailer tongue. When the reflected beam is received by the unit receiver, the alerting device is activated.

In another embodiment of the present invention, the alerting device is an audible alarm located in the interior of the towing vehicle. In still another embodiment, the system includes a power source connected to the sensor mechanism and the alerting device. In yet another embodiment, the power source is the electrical system of the towing vehicle.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
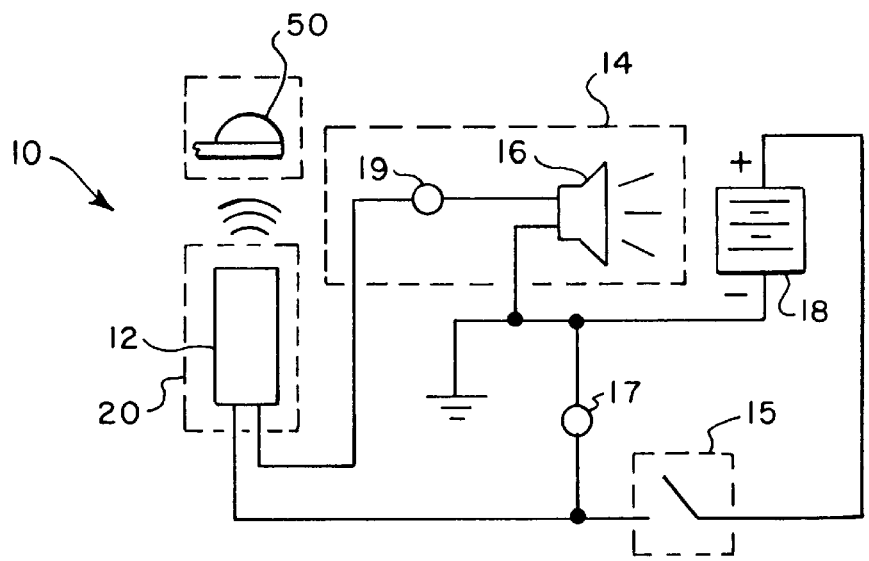
FIG. 1 is an alignment system in block diagram form depicting the components of an embodiment of the present invention.
Figure 2:
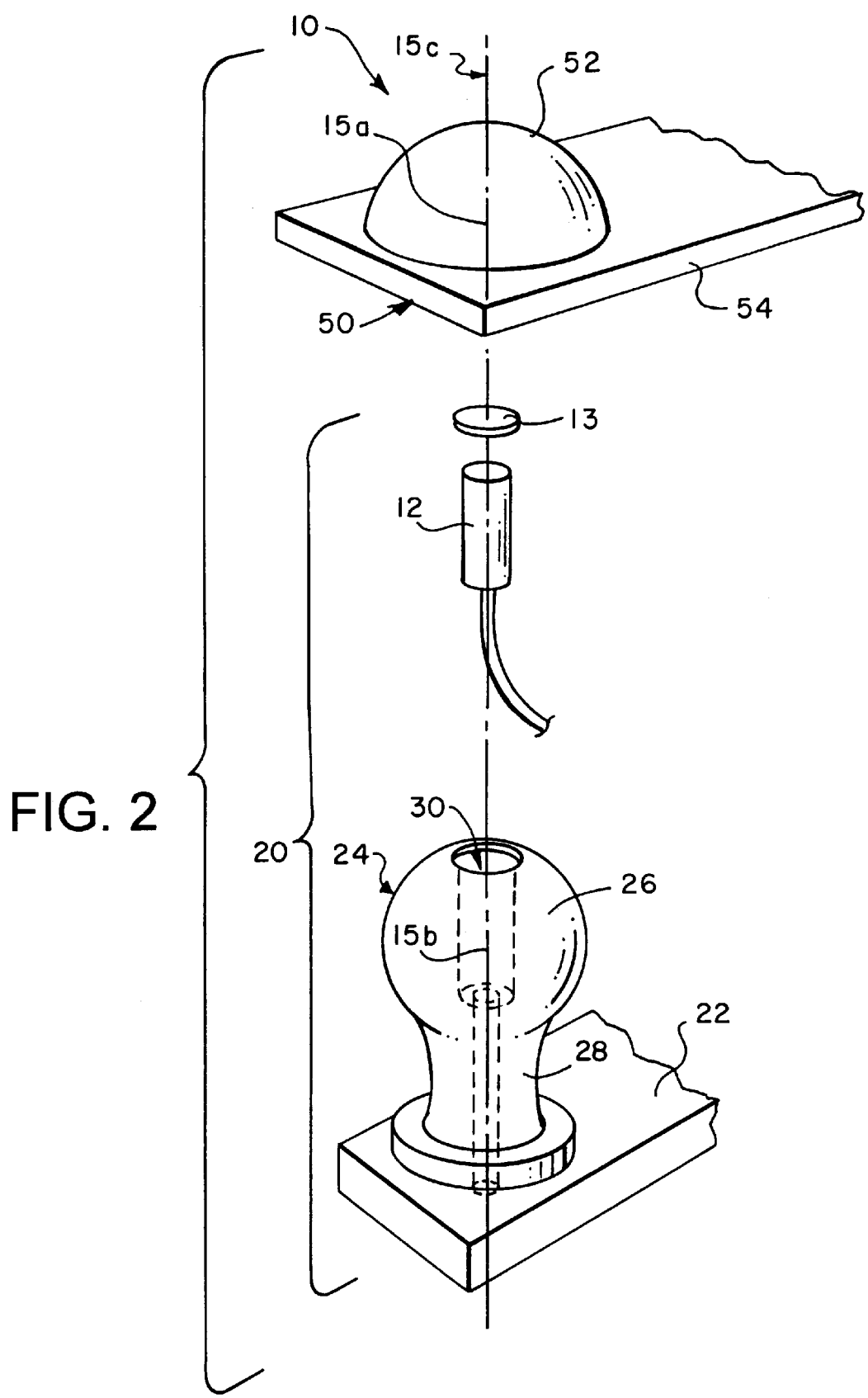
FIG. 2 is an exploded view of the ball assembly of the trailer hitch of the present invention, in vertical alignment with a trailer tongue.

The present invention is a trailer hitch alignment system useful for alerting the driver of a towing motor vehicle of the vertical alignment between the trailer hitch of the towing vehicle and the trailer tongue of the trailer. As shown in FIGS. 1 and 2, the trailer hitch alignment system 10 of the present invention includes a tow bar assembly 20 having a sensor mechanism 12, a trailer tongue 50, an alerting device 14, a power switch 15, and a power source 18. Power source 18, preferably the 12-volt D.C. electrical system of the towing motor vehicle, is connected to sensor mechanism 12 and alerting device 14, and accessed through power switch 15. A power-on light 17 illuminates when the power switch 15 is turned on. The alerting device 14 may include a dash-mounted audible alarm such as a horn 16, or an alerting light 19, or both. An audible alarm is recommended since the driver is probably looking out the rear of the towing vehicle while backing up to a trailer.

Figure 4:
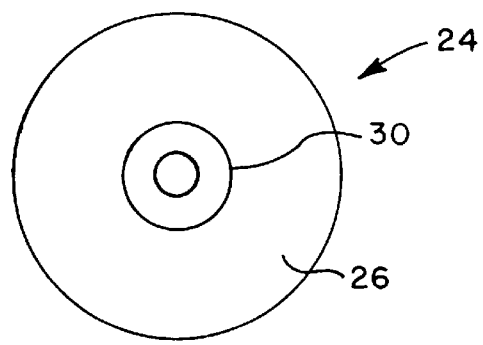
FIG. 4 is a top plan view of the spherical top of the ball assembly shown in FIG. 2.

Referring to FIG. 2, tow bar assembly 20 is attached to a towing vehicle (not shown) and is adapted for coupling with a trailer tongue 50 of a trailer (not shown). Tow bar assembly 20 includes sensing mechanism 12, a tow bar 22 and a hitch ball 24 mounted on the tow bar 22. In the embodiment shown in FIGS. 2 and 4, the hitch ball 24 includes a spherical top 26, a cylindrical body 28, and an aperture 30 extending therethrough, shown in phantom, such that ball 24 forms an annular casing for receiving the sensor mechanism 12. When housing the sensor mechanism 12, the hitch ball 24 includes a protective lens 13 to prevent dirt and debris from damaging the sensor 12.

Figure 3:
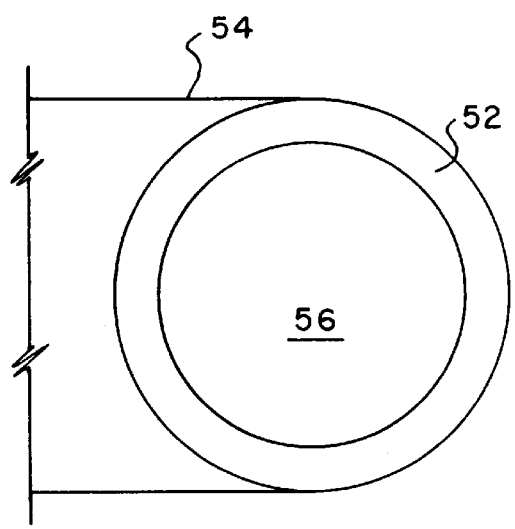
FIG. 3 is a bottom plan view of the socket shown in FIG. 2.

With reference to FIGS. 2 and 3, trailer tongue 50 includes a trailer bar 54, and a semi-spherical socket 52 having a concave interior surface 56 adapted for receiving hitch ball 26 to couple the towing vehicle to the trailer.

Operation of the invention will now be described with reference to FIGS. 1–4. After activating system 10 with switch 15, the driver maneuvers the tow bar assembly 20 toward coupling position with the trailer tongue 50. When the central vertical axis 15a of socket 52 is vertically aligned with the central axis 15b of the ball assembly 24, the sensing mechanism 12 activates the alerting device 14 and sounds the audible alarm 16.

Figure 6:
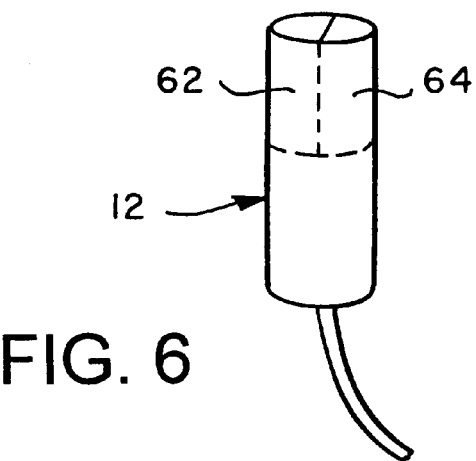
FIG. 6 is an isometric view of the sensor mechanism.

With reference to FIG. 6, the sensor mechanism 12 is preferably a photoelectric sensor. In particular, the sensor mechanism may be a diffuse reflective unit having an infrared transmitter 62 and an infrared receiver 64. A suitable diffuse reflective sensor is an OFB-FPKG (Focused Beam) diffuse reflective sensor from IFM Effector, Inc., Exton, Pa. In this embodiment, transmitter 62 sends a focused infrared beam into the atmosphere. When interior surface 56 is in alignment with ball assembly 24, the beam is reflected off surface 56 into receiver 64, thereby sending a signal to activate alerting device 14. The sensor may have an approximate maximum sensing range of sixteen inches, operating off a twelve volt direct current power source.

In an alternative embodiment, sensor mechanism 12 is a passive photoelectric infrared sensor. When the hitch ball 24 is moved into vertical alignment with socket 52 along axis 15c, ambient heat from the interior surface 56 is absorbed by sensor 12 causing senor 12 to signal alerting device 14.

It will be understood and appreciated by those skilled in the art that other photoelectric sensors may be suitable for sensing mechanism 12 as long as the sensing beam is narrowly focused and the sensor range is on the order of several inches, in order to prevent false alerting signals from objects in the environment other than the trailer tongue 54. In addition to photoelectric devices, suitable sensors may include focused beam, short range sensors using ultrasonic, radar or laser technologies.

Figure 5:
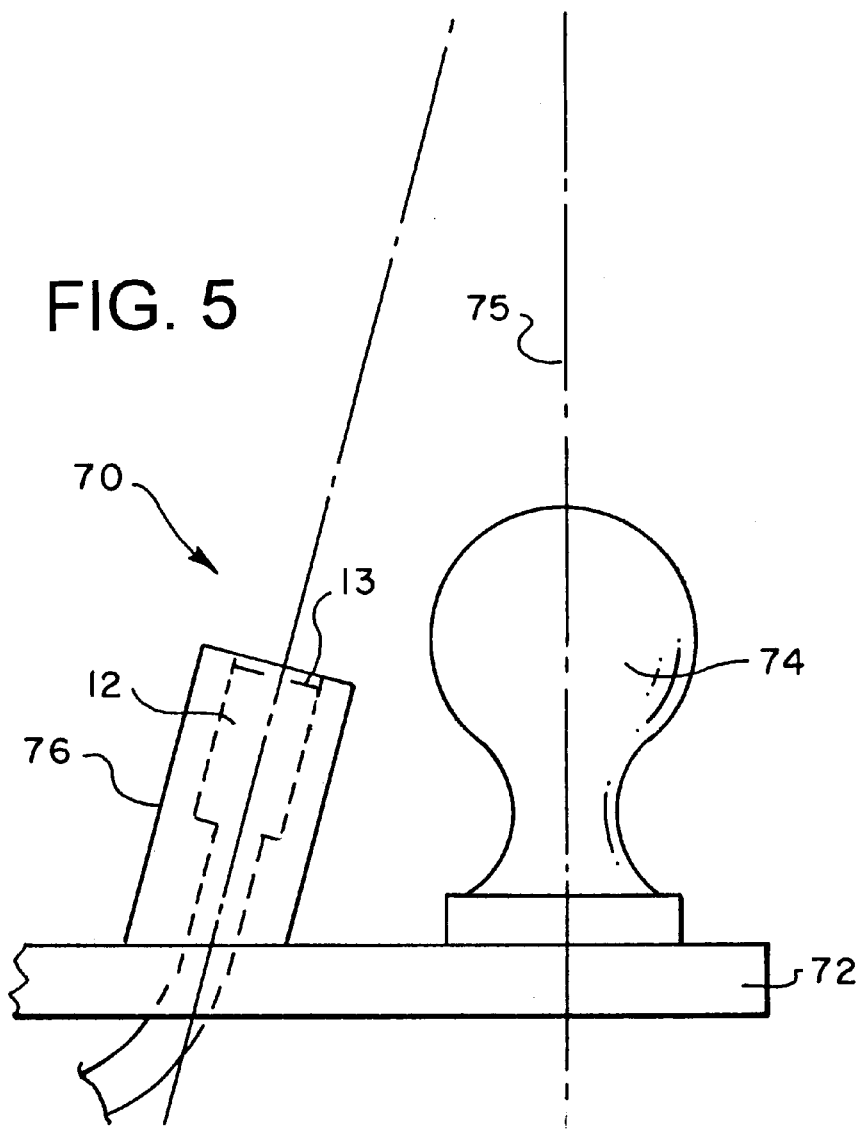
FIG. 5 is a side elevation view of a trailer hitch incorporating another embodiment of the present invention.

Referring to FIG. 5, an alternative embodiment of the invention is shown utilizing tow bar assembly 70. Tow bar assembly 70 comprises a sensor housing 76 adjacent to hitch ball 74 and mounted on tow bar 72. Sensor mechanism 12 (FIG. 2) is mounted inside the sensor housing 76. a protective lens 13 prevents dirt and debris from damaging the sensor 12. In this embodiment, sensor mechanism 12 is adapted to sense a trailer tongue 50 (FIG. 2) when it is proximal to the vertical central axis 75 of hitch ball 74. Other mounting locations and orientations of the sensor 12 are possible within the scope of the present invention.

It is thus believed that the operation and construction of the present invention will be apparent from the foregoing description. While the system shown and described has been characterized as being preferred, it will be readily apparent that various changes and modifications could be made therein without departing from the spirit and scope of the invention as defined in the following claims.

What is claimed is:

1. A trailer hitch alignment system comprising:

a tow bar assembly attached to a towing vehicle, said tow bar assembly having a ball mounted on a tow bar, said ball having a spherical top and a cylindrical body;

a trailer tongue for connecting a trailer to the tow bar assembly, said trailer tongue having a semi-spherical socket with a concave surface adapted for receiving the spherical top of the ball;

a sensor mechanism mounted on the tow bar adjacent the ball that detects the trailer tongue when the trailer tongue is in vertical alignment with the tow bar assembly, said sensor mechanism detecting the vertical alignment of the concave surface of the semi-spherical socket with the spherical top of the ball;

an alerting device connected to the sensor mechanism for alerting a driver in the towing vehicle that the trailer tongue is in vertical alignment with the tow bar assembly; and a power source connected to the sensor mechanism and the alerting device.

2. The wailer hitch alignment system of claim 1, wherein said spherical top and cylindrical body of said ball have an aperture extending therethrough along a central vertical axis thereof, said ball forming an annular casing adapted for receiving said sensor mechanism.

3. The trailer hitch alignment system of claim 1, wherein the sensor mechanism includes an infrared sensor.

4. The trailer hitch alignment system of claim 1, wherein the sensor mechanism includes a photoelectric sensor.

5. The trailer hitch alignment system of claim 4, wherein said photoelectric sensor is a diffuse reflective unit.

6. The trailer hitch alignment system of claim 5, wherein said sensor mechanism includes:

a transmitter for transmitting a focused beam; and a receiver for receiving a reflection of said focused beam from said trailer tongue.

7. The trailer hitch alignment system of claim 6, wherein said focused beam is adapted for reflection off the concave surface of said socket of the trailer tongue.

8. A trailer hitch alignment system, comprising:

a tow bar assembly attached to a towing vehicle, said tow bar assembly including a ball mounted on a tow bar, said ball having a spherical top and a cylindrical body, said spherical top and cylindrical body of said ball having an aperture extending therethrough along a central vertical axis thereof, said ball forming an annular casing;

a trailer tongue for connecting a trailer to said tow bar assembly, said trailer tongue including a semi-spherical socket having a concave surface adapted for receiving said spherical top of said ball;

a photoelectric sensor mounted in said annular casing formed by said ball, said photoelectric sensor detecting said trailer tongue when said trailer tongue is in vertical alignment with said ball;

an alerting device in an interior cab of said towing vehicle which is connected to said photoelectric sensor, said alerting device alerting a driver in said towing vehicle that said trailer tongue is in vertical alignment with said tow bar assembly; and means for connecting an electrical system of said towing vehicle to said photoelectric sensor and said alerting device.

9. The trailer hitch alignment system of claim 8, wherein said photoelectric sensor includes:

a transmitter for transmitting a focused beam; and a receiver for receiving a reflection of said focused beam from said trailer tongue.

10. The trailer hitch alignment system of claim 8, wherein said photoelectric sensor is an infrared sensor.

* * * * *